United States Patent
Voll

[11] 3,714,563
[45] Jan. 30, 1973

[54] TRANSISTOR INDICATOR CIRCUIT IN A METAL DETECTING APPARATUS

[76] Inventor: Christl Voll, Nikolaus-Feystrasse 2, Hassfurt, Germany

[22] Filed: May 28, 1971

[21] Appl. No.: 148,043

[30] Foreign Application Priority Data

June 4, 1970 Germany.....................P 20 27 408.2

[52] U.S. Cl. ............................324/67, 324/3, 324/41
[51] Int. Cl. ...............................................G01v 3/08
[58] Field of Search...324/3, 41, 133, 67; 340/248 C, 340/258 C; 317/146; 331/65

[56] References Cited

UNITED STATES PATENTS

| | | | |
|---|---|---|---|
| 3,067,364 | 12/1962 | Rosso | 340/258 C UX |
| 3,436,751 | 4/1969 | Hron et al. | 340/248 C |
| 3,201,774 | 8/1965 | Uemura | 324/3 X |
| 3,503,007 | 3/1970 | Kutschbach | 324/3 X |
| 3,099,827 | 7/1963 | Wu | 324/133 X |
| 3,210,677 | 10/1965 | Lin et al. | 307/315 X |

FOREIGN PATENTS OR APPLICATIONS 1,084,348   9/1967   Great Britain.........................324/41

*Primary Examiner*—Gerard R. Strecker
*Attorney*—Sughrue, Rothwell, Mion, Zinn & Macpeak

[57] ABSTRACT

A metal detecting apparatus including an oscillator circuit, a switching circuit and an amplifying circuit, arranged to give a visual or other signal upon detection of a metal within a threshold distance from a ferrite rod in the apparatus. When a metal is detected, the Q value increases and the oscillator circuit current decreases.

2 Claims, 3 Drawing Figures

PATENTED JAN 30 1973

3,714,563

CHRISTL VOLL, INVENTOR
BY Sughrue, Rothwell, Mion, Zinn & Macpeak ATTORNEYS

A TRANSISTOR INDICATOR CIRCUIT IN A METAL DETECTING APPARATUS

BACKGROUND OF THE INVENTION

The present invention relates to metal detecting apparatus, by which term is to be understood apparatus with which it is possible to detect metal objects without contact with the objects themselves, while the apparatus is located at a distance from the objects. Apparatus of this type is particularly useful in the tracing of installation or supply pipes, for example gas- or water pipes, sanitary fittings, heating pipes, and iron reinforcements of all types, in plaster, masonry or concrete. However, the apparatus is not limited to the detection of these types of metal object, and can be used for the detection of objects hidden from view.

Manual workers sometimes have repair work to carry out, in which there is a danger that supply pipes or other metal objects could be severed by the workers, and incidents of this type have led in the past to fatal accidents, in many cases, where electric conductors have been cut.

Apparatus has been devised in the past using two oscillators, which give rise to a beat frequency in the audio-frequency range. However, such apparatus has normally been very expensive, and furthermore it is not possible to quote for such an apparatus a definite maximum distance of operation.

A further type of apparatus for a similar purpose has been devised, with which the conductor to be detected must be in a closed circuit, or at least must be connected to one terminal of a to voltage source (for example an audio-frequency alternating voltage). However, when using this type of apparatus it is necessary that the metal object to be detected must be brought very close to the apparatus in order for the latter to work satisfactorily. The range of operation of this apparatus is far too short for the apparatus to be particularly useful.

SUMMARY OF THE INVENTION

According to the present invention, there is provided metal detecting apparatus comprising a single ferrite rod, an electrical oscillator circuit including a first winding carried by the ferrite rod; a second winding carried by the ferrite rod and inductively coupled by the ferrite rod to the first winding; a transistor in the oscillator circuit, conductively coupling the first and second windings; a driving battery; switch means selectively operable to connect the oscillator circuit to said battery; a resistive device of variable resistance mechanically coupled to the switch means, connected in the emitter circuit of the oscillator transistor and selectively adjustable to vary the amplitude of the oscillation in the oscillator circuit; a switching circuit connected to the oscillator circuit and including a switching transistor; a diode rectifier connected in the emitter circuit of the switching transistor to stabilize the switching transistor against variations in temperature and to provide a bias to cause the switching transistor to be in one or the other of two stable states of conduction and non-conduction, respectively, in dependence or the amplitude of the oscillatory current in the second winding; output amplifying means responsive to an output signal derived from the switching transistor and comprising a pair of further transistors connected in Darlington configuration with the emitter of one of the pair of further transistors connected to the base of the other of the pair of further transistors; and indicating means for giving a visual signal, connected to the amplifying means.

BRIEF DESCRIPTION OF THE DRAWINGS

An embodiment of the invention will now be described, with reference to the accompanying drawings, in which.

DESCRIPTION OF PREFERRED EMBODIMENT

Figure 1:
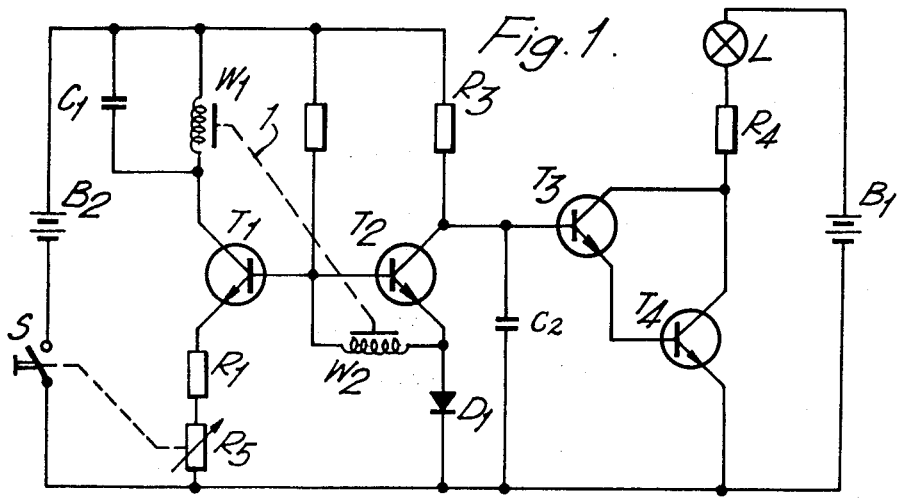
FIG. 1 shows a circuit diagram of a metal detecting apparatus.

With reference to FIG. 1, the circuit consists of a battery B2 connected in series with a switch S mechanically coupled with a variable resistor R5 which is connected in series with a fixed resistor R1 between the emitter of an oscillating transistor T1 and a negative bus-bar shown at the bottom of the Figure. The collector of the transistor T1 is connected through an oscillator winding W1 to a positive bus-bar, shown at the top left hand portion of FIG. 1, the winding W1 being wound around a single ferrite rod, shown schematically by the dotted line 1. In parallel with the winding W1 is connected a capacitor C1.

The base of the transistor T1 is connected to, the positive bus-bar through a resistance and also directly connected to the base of a switching transistor T2, whose collector is connected through a resistance R3 to the positive bus-bar.

A feed-back winding W2 is connected directly between the base and the emitter of the switching transistor T2.

A diode D1 having its direction of easy current flow downwards as shown in FIG. 1, is connected between the emitter of the transistor T2 and the negative bus-bar. A filter capacitor C2 is connected between the negative bus-bar and the collector of transistor T2, which is also connected directly to the base of a third transistor T3. The emitter of the transistor T3 is directly connected to the base of a fourth transistor T4 which has its emitter connected to the negative bus-bar, and the collectors of the transistors T3 and T4 are connected together in a Darlington pair configuration through a resistance R4 and an indicating lamp L to the positive terminal of a battery B1, the negative terminal of which is directly connected to the negative bus-bar.

From the above description it will be apparent that the circuit in toto consists effectively of three circuits arranged side by side from left to right in the Figure, viz. an oscillator circuit including the transistor T1, a switching circuit including the transistor T2, and an amplifying stage including the transistors T3 and T4 to amplify the output signal from the switching transistor T2. The windings W1 and W2 are mounted on the same ferrite rod 1. The resistors R1 and R5 connected in series constitute a negative feed-back resistive device for adjustment of the sensitivity of the apparatus, as will be described below.

The principle of operation of the apparatus involves the production of a magnetic field extending out into space from the ends of the ferrite rod, and the fact that when a metal object to be detected is brought into proximity with the ferrite rod the metal object represents an energy sink for the circuit, so that the energy dissipated in each cycle increases, with the result that the Q value of the circuit decreases. With the described circuit the presence of a metal object is confirmed by observing a reduction in the Q value of the circuit. The switching circuit and amplifying circuit are provided in order to produce a convenient indication of such a reduction in the Q value.

When there is no metal in the proximity of the ferrite rod, the base and emitter of the switching transistor T2 are at substantially the same potential, since the D.C. resistance of the feed-back winding W2 is very small. In this condition the transistor T2 will not be able to conduct. There will be no output from the transistor T2, with the result that no current will flow through the indicating lamp L. When, however, a metal object is brought into proximity of the ferrite rod 1, the amount of energy dissipated in the oscillator circuit is increased since the metal object acts as an energy sink, so that the oscillatory current flowing in the oscillator circuit is reduced, thereby lowering the mean value of the effective base potential of the transistor T2, which is positively biassed by the battery B2 through the resistor R3, thus to reduce the collector current of the transistor TR. Since the collector of transistor T2 is connected directly to the base of transistor T3, the base potential of the latter transistor increases, which in turn results in the base potential of the transistor T4 rising. The output from the Darlington pair T3 and T4 will increase, and the lamp will light.

By the way of summary, when a metal object is brought up to the ferrite rod the lamp L lights, and when the metal is withdrawn or no metal is present, the lamp L goes out. However, the circuit must be adjusted, by choosing a suitable value of R5, so that the reduction in Q value produced by the arrival of a particular metal object in proximity with the ferrite rod will be sufficient to cause an adequate output signal from the switching transistor T2 for the lamp to light when this signal, after amplification by the Darlington pair T3 and T4, is fed through the lamp.

Figures 2, 3:
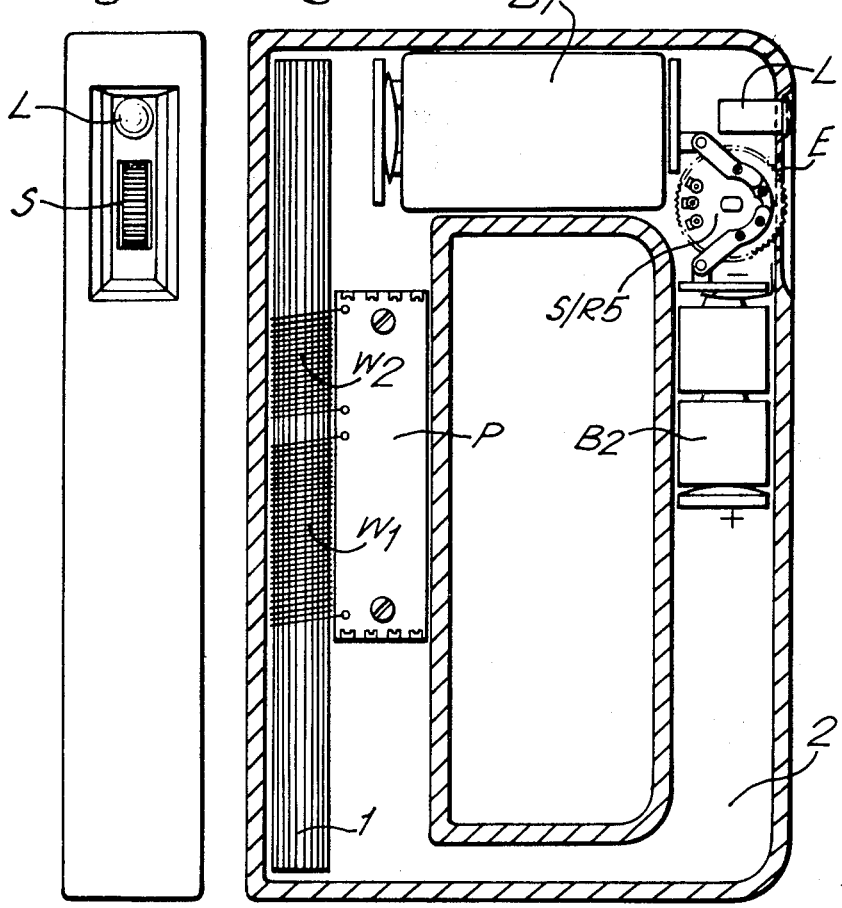
FIG. 2 shows the apparatus using the circuit of FIG. 1 in longitudinal section and installed in a portable housing.
FIG. 3 shows the apparatus of FIG. 2 in end elevation.

FIG. 2 shows the components of the circuit of FIG. 1, arranged in a housing, but not all the components are shown in FIG. 2, for the sake of clarity.

FIG. 3 clearly shows the switch S and lamp L, both of which are accessible, as shown, from the outside of the housing.

The effective range of a metal detecting apparatus depends on the type and amount of the metal to be detected, and an apparatus should preferably be able to detect an electric copper wire in a plastics material tube, such tubes lying in the range between two and three cm under plaster very commonly. In order to be really useful, an apparatus should have a maximum distance of operation of at least four cm for covered wires of 3 by $1.5^2$ copper, which also corresponds to a maximum range of 9 cm for an iron reinforcement of 8 mm or a maximum range of 20 cm for iron parts of large area.

By adjusting the value of the sum of R1 and R5, thereby varying the amount of negative feed-back present in the oscillator circuit, the threshold range of operation, and thus the sensitivity of the apparatus, may be adjusted. With a large value of feed-back resistance, the amplitude of oscillation of the oscillator circuit becomes smaller, so that the conductive state of the switching transistor T2 is approached. In this condition, only a small reduction in Q value resulting from outside influences is sufficient to trigger the switching transistor T2 into its conductive state, and it follows that if the feed-back resistance is increased even more, then a point will be reached at which the switching transistor T2 will become conductive even without any outside influence. For this reason, it is not possible in practice to allow R1 to exceed a certain critical value. When the apparatus is about to be used, it is switched on by closing the switch S, which may, for example, be controlled by a rotatable knurled wheel E, in which case the knob may be turned further in the same direction after closing the switch S in order to increase the value of R5. This resistance is increased to the point at which the sum Ra of the resistances R1 and R5 is almost sufficiently high to make the switching transistor become conductive without external influences, in which condition the lamp L becomes fully alight. Thereafter the value of R5 is reduced by turning the knurled wheel E in the opposite direction, until the indicating lamp L goes out. It is thus ensured that the value of Ra is below that at which the lamp will light without external influence, while the maximum sensitivity is achieved by having the value of Ra below the critical value by the minimum possible amount.

It will be apparent that changes in the supply voltage or the structural members do not have any influence, since the adjustment described above is carried out afresh on each occasion when the apparatus is switched on. Furthermore, variations in temperature are compensated.

The above described metal detecting apparatus may be cheap to produce and the complexity of construction is reduced to a minimum, and also deterioration of the apparatus with the passing of time does not occur. It is emphasized that the switching transistor T2, which receives the signal from the oscillator, has reliable stabilization. This would normally be achieved by means of a Schmit trigger. With the diode D1, connected in the emitter circuit of the switching transistor T2 as shown in FIG. 1, the stabilization of the arrangement is improved, since when a metal object is brought up towards the ferrite rod, into the range of the apparatus, the threshold distance at which the switching transistor become conductive is more clearly defined.

A certain hysteresis is possessed by the switching circuit, and this is necessary if the point of switching-over from the conductive state to the non-conductive state or vice versa, of the switching transistor T2, is to be clearly defined.

The value of the resistance R5 in any particular case must be chosen in accordance with the effects of external influences which affect the switching transistor, such as temperature variations, changes in supply voltage, constructional component changes, etc. These influences should, however, be kept as small as possible, so that the value of R5 itself can be chosen to be small, resulting in maximum sensitivity and easy adjustment.

Improved performance of the apparatus is achieved when the supply voltage to the oscillator circuit is kept completely constant. In order to achieve this result the supply to the oscillator circuit is connected through an independent battery of great stability. Since the oscillator circuit has a consumption of only about 1 mA, almost absolute constancy of the oscillator circuit voltage can thus be achieved.

The base emitter voltage of the transistor T1 and similarly the voltage across the diode D1, influence the value of base the potential at which switching-over of the transistor T2 occurs. The voltages, however, vary with temperature by equal amounts, so that the diode D1 is very effective in providing temperature stabilization. With such an arrangement it is possible to keep the required variation in the range of required values of the resistance R5 relatively small.

From the above description it will be apparent that the described embodiment is a considerable improvement over the prior devices mentioned above, and the apparatus satisfies an urgent demand which existed previously for an apparatus with the capabilities of this embodiment.

I claim:

1. Metal detecting apparatus comprising, in combination:
    a single ferrite rod;
    an electrical oscillator circuit;
    a first winding in said oscillator circuit, carried by said rod;
    a second winding carried by said ferrite rod and inductively coupled by said ferrite rod to said first winding;
    a transistor in said oscillator circuit and conductively coupling said first and second windings;
    a driving battery;
    switch means selectively operable to connect said oscillator circuit to said battery;
    a resistive device of variable resistance mechanically coupled to said switch means, connected in the emitter circuit of said oscillator transistor and selectively adjustable to vary the amplitude of the oscillation in said oscillator circuit, whereby said resistive device is automatically set to a minimum initial value of resistance when said switch means is operated to connect said oscillator circuit to said battery;
    a switching circuit connected to said oscillator circuit and including a switching transistor;
    a diode rectifier connected in the emitter circuit of said switching transistor to stabilize said switching transistor against variations in temperature and to provide a bias to cause said switching transistor to be in one or the other of two stable states of conduction and non-conduction, respectively, in dependence on the amplitude of the oscillatory current in said second winding;
    output amplifying means responsive to an output signal derived from the switching transistor and comprising a pair of further transistors connected in Darlington configuration with the emitter of one of said pair of further transistors connected to the base of the other of said pair of further transistors, and
    indicating means for giving a visual signal, connected to said amplifying means.

2. Apparatus as defined in claim 1, further comprising a limiting resistive device connected in series with said indicating means, a second driving battery connected in series with said indicating means and said limiting resistive device, and wherein said second battery, said indicating means and said limiting resistive device are connected between the collector and the emitter of said other further transistor.

* * * * *